UNITED STATES PATENT OFFICE.

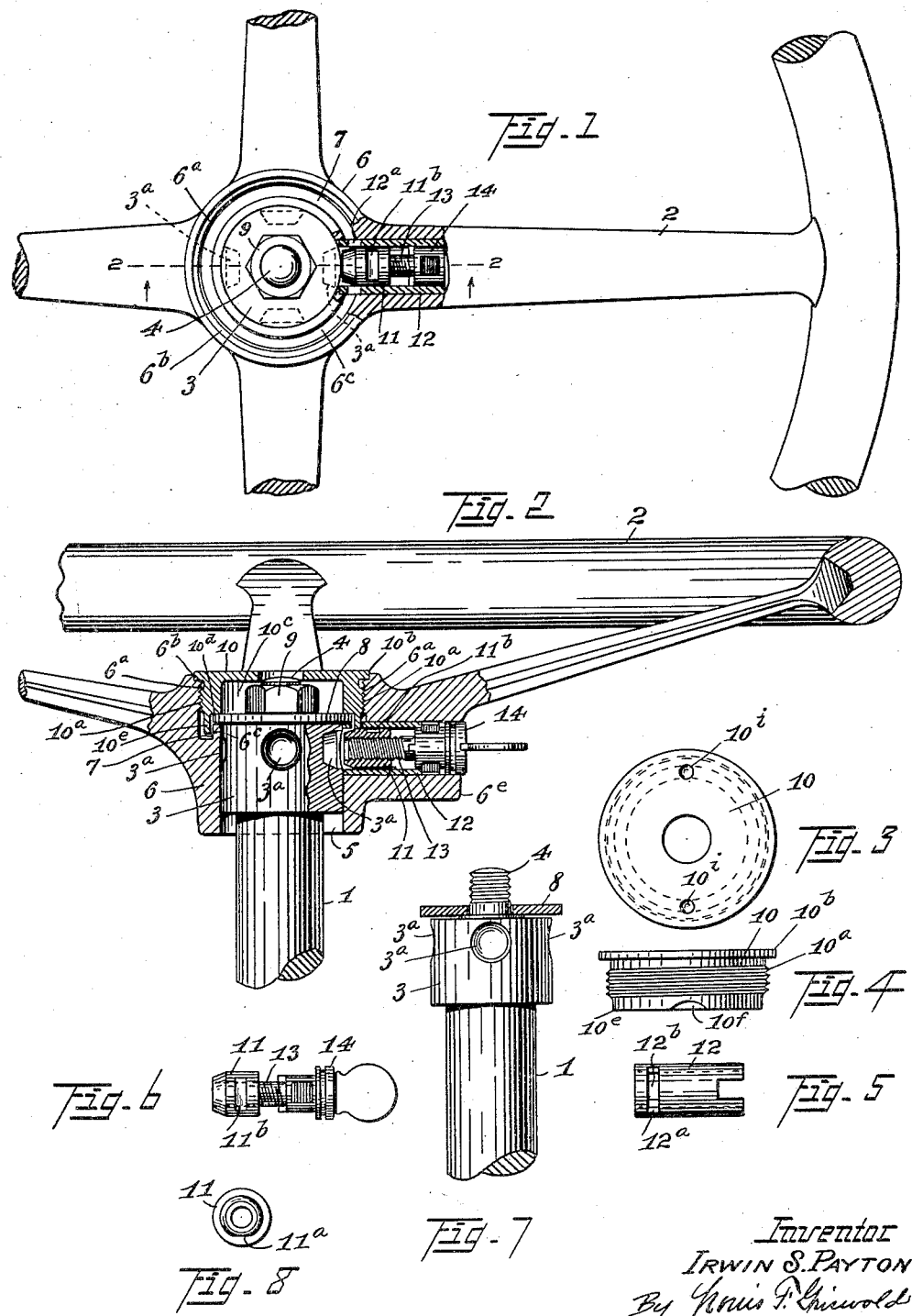

IRWIN S. PAYTON, OF CLEVELAND, OHIO.

MOTOR-VEHICLE LOCK.

1,358,106.  Specification of Letters Patent.  Patented Nov. 9, 1920.

Application filed May 12, 1920. Serial No. 380,803.

*To all whom it may concern:*

Be it known that I, IRWIN S. PAYTON, a citizen of the United States, residing at Cleveland, in the county of Cuyahoga and State of Ohio, have invented certain new and useful Improvements in Motor-Vehicle Locks, of which the following is a specification.

This invention relates to means employed for locking motor vehicles, as a protection against theft, or the use of the vehicle by an unauthorzed person, and is in the nature of an improvement in the construction of appliances of this character for which Patent No. 1,230,907, was issued June 26th, 1917, to Arthur W. Lamp.

The objects of the present invention are, like those of the said patent, to provide a device of the character mentioned, which is so constructed that the steering column of the vehicle can not be turned by the steering wheel when the vehicle is locked.

Another object of the present invention is to provide a construction that is more economical and efficient than that described in the prior patent.

With these objects in view, the invention consists in the novel construction, combination and arrangement of parts as hereinafter described and pointed out definitely in the appended claims, reference being had to the accompanying drawings which are made part of the specification, similar reference characters being employed to designate corresponding parts.

In the said drawings Figure 1 is a fragmentary plan of an embodiment of the invention, partially in section, and with a retaining cap and washer removed.

Fig. 2 is a sectional elevation on line 2—2 of Fig. 1.

Fig. 3 is a plan of the retaining cap, and Fig. 4 is an elevation of said cap.

Fig. 5 is a top view of a bushing member employed.

Fig. 6 illustrates the locking members assembled, detached from the wheel member.

Fig. 7 is a fragmentary elevation of the steering post, detached, and Fig. 8 is an end view of the locking bolt.

An embodiment of my invention includes a part of the steering mechanism for motor vehicles, comprising the steering column 1, a steering wheel 2 loosely mounted on the steering column, and a key-controlled device for rigidly connecting said steering wheel and steering column together, said device being mounted in the steering wheel. These elements are embodied in the patent above referred to, and are also common factors in other appliances of this class. The salient features of the present invention are the means for efficiently retaining the elements in proper operative assemblage.

The steering column 1 is provided with a head 3, and a threaded stud 4. The steering wheel 2 is journaled on the head 3, the bore 5, in the hub 6 of the wheel, being provided for this purpose. The upper portion of the hub bore is of greater diameter than that part which bears on the head 3, and is internally threaded, as shown at $6^a$. An annular shoulder 7 is formed in the hub at the upper terminal of the bearing bore.

The head 3 is inserted in the hub bore 5 at the lower end, a washer 8 is slipped on the stud 4, and a nut 9 is threaded onto said stud and bears on the washer 8. A cap 10 is provided with an external thread $10^a$ which fits the internal thread $6^a$ of the wheel hub. Said cap has an annular flange $10^b$ adapted to seat on a ledge $6^b$ formed in the hub. A chamber $10^c$ is also provided in the cap, and an interior annular shoulder $10^d$ is adapted to bear on the washer 8 when the said cap is screwed into the hub of the steering wheel. A skirt $10^e$ extends below the shoulder $10^d$ into an annular channel $6^c$ in the hub 6. The cap 10 coacting with the hub 6 confines the washer 8 between the shoulder $10^d$ and the opposing shoulder 7, and retains the head 3 rotatable in the hub 6, the chamber $10^c$ providing clearance for the nut 9.

Recesses $3^a$ are formed in the head 3, said recesses being adapted to receive the locking bolt 11 when operated as hereinafter described.

The locking mechanism is housed in an extension $6^e$ of the hub 6, and comprises a bushing 12 in which the operating mechanism is mounted. The said bushing fits tightly in the extension $6^e$ and extends into the annular shoulder 7, or flush with the journal bearing, and has a slot $12^a$ which provides clearance for the skirt $10^e$. The bolt 11 is mounted in the bushing 12, and is operated, reciprocally by the screw 13, said screw being actuated by the key-lock 14, means being provided for preventing rotation of the bolt 11 relatively to the bushing. In the present case the bolt is flattened, as shown at $11^a$, Fig. 8, and the flat surface bearing on a flat surface 12$^b$ in the bushing 12 prevents rotation of the bolt, and permits reciprocation of said bolt. The bolt 11 is provided with a groove 11$^b$ in the top, and when the bolt is seated in one of the recesses 3$^a$ of the head 3, said groove registers with the slot 12$^a$ in the bushing 12. The skirt 10$^e$ is provided with a notch 10$^f$, as shown in Fig. 4. When the bolt 11 is withdrawn clear of the recess 3$^a$, it engages the notch 10$^f$ and thereby prevents revolution of the cap 10. Therefore when the steering wheel is loose on the steering column the cap cannot be removed, but when the wheel is locked to the column the cap may be unscrewed, as the skirt 10$^e$ will clear the bolt 11, in the groove 11$^b$. Holes 10$^i$ are provided in the face of the cap to accommodate a spanner wrench. The top of the cap 10 provides a convenient location for a name plate, and if desired, the holes 10$^i$ may be threaded and a plate attached by screws, thereby masking the means of operating the cap. This, however, is no part of the invention and therefore is not illustrated.

What I claim and desire to secure by Letters Patent is—

1. In a motor vehicle lock, the combination of the steering column; a journal head on said column; the steering wheel hub journaled on said head; a stud extending upward from said head; a washer on said stud; a shoulder in the hub bore, on which said washer bears; a retaining nut on the stud; a cap provided with a chamber, screw-threaded in the top of the hub bore and adapted to bear on top of the washer; one or more radial recesses in the head; a reciprocating bolt mounted in the wheel member and adapted to register with said recesses; and lock mechanism for actuating said bolt.

2. In a motor vehicle lock, the combination of the steering column; a journal head on said column, said head provided with one or more radial recesses; the steering wheel hub journaled on said head; a tubular bushing confined in the wheel hub and extending radially from the journal bearing; a reciprocating bolt, and lock mechanism for actuating said bolt, mounted in said bushing and adapted to register with the recesses in the journal head; a stud extending upward from the journal head; a washer on said stud; a shoulder in the hub, on which said washer bears; a retaining nut on the stud; a cap provided with a chamber, screw-threaded into the top of the hub bore; a shoulder on said cap adapted to bear on the washer, and a skirt on said cap depending below said washer through a slot provided in the bushing member, said skirt being provided with a notch which engages the bolt when said bolt is withdrawn from the recesses in the head.

In testimony whereof I affix my signature.

IRWIN S. PAYTON.